United States Patent [19]

Allen

[11] E Patent Number: Re. 33,287

[45] Reissued Date of Patent: Aug. 7, 1990

[54] CARRIER TRACKING SYSTEM

[75] Inventor: John B. Allen, Richardson, Tex.

[73] Assignee: Texas Instruments Incorporated, Dallas, Tex.

[21] Appl. No.: 355,741

[22] Filed: May 19, 1989

Related U.S. Patent Documents

Reissue of:

[64] Patent No.: 4,666,103
Issued: May 19, 1987
Appl. No.: 118,164
Filed: Feb. 4, 1980

[51] Int. Cl.[5] ..... F41G 7/30

[52] U.S. Cl. ..... 244/3.11

[58] Field of Search ..... 244/3.11, 3.13, 3.16

[56] References Cited

U.S. PATENT DOCUMENTS

| | | | |
|---|---|---|---|
| 2,906,885 | 9/1959 | Orthuber et al. | 250/222 |
| 2,930,894 | 3/1960 | Bozeman | 244/3.11 |
| 2,989,640 | 6/1961 | Turck | 244/3.16 |
| 3,065,931 | 11/1962 | Dixon et al. | 244/14 |
| 3,098,933 | 7/1963 | Barasch | 250/203 |
| 3,111,088 | 11/1963 | Fisk | 244/3.16 |
| 3,128,061 | 4/1964 | Chew | 244/3.15 |
| 3,219,826 | 11/1965 | Letaw, Jr. | 250/83.3 |
| 3,227,879 | 1/1966 | Blau et al. | 250/84 |
| 3,233,847 | 2/1966 | Girsberger | 244/3.11 |
| 3,242,485 | 3/1966 | Astheimer | 343/6 |
| 3,275,829 | 9/1966 | McClure et al. | 250/85 |
| 3,366,346 | 1/1968 | McKnight et al. | 244/3.11 |

(List continued on next page.)

FOREIGN PATENT DOCUMENTS

| | | | |
|---|---|---|---|
| 1914250 | 10/1970 | Fed. Rep. of Germany | 244/3.16 |
| 2657261 | 7/1977 | Fed. Rep. of Germany . | |
| 7415025 | 2/1976 | France . | |

OTHER PUBLICATIONS

*Dictionary of Scientific and Technical Terms;* McGraw-Hill; 1978; pp. 825 & 1022.

Texas Instruments TMS9900 Microprocessor Series Data Manual; 1978.

Texas Instruments 9900 SBP 9989 Advanced 16 Bit I²L Microprocessor, Microprocessor Series Data Manual, 1982.

Cwo, T. L. Golden, *National Defense,* "*The Dragon Missile*", *Jan.-Feb. 1974, pp. 348-349.*

Philip J. Klass, *Aviation Week,* "Infrared Challenges Radar's Monopoly", 4/25/57.

Philip J. Klass, *Aviation Week,* "Optical Guidance Designed for Missiles", 12/8/58, pp. 67, 69, 71.

James R. Spencer, *Radio Electronics,* "Infrared Guides Missiles", 1/60.

Bernard D. Steinberg, *Modern Radio Analysis, Evaluation, and System Design,* Chapter 2, "MTI Radar Filters", pp. 491-492.

Merrill I. Skolnik, *Introduction to Radar Systems,* 1962, pp. 534-536, 594-602.

*Primary Examiner*—Charles T. Jordan

*Attorney, Agent, or Firm*—Ferdinand M. Romano; René E. Grossman; Melvin Sharp

[57] ABSTRACT

An infrared tracker for tracking a carrier in clutter comprises a pyrotechnically heated emitter, a beam concentrator, and a blanking means all of which are mounted on the carrier, and a command link, a thermal detector, a display signal storage means, a display, and a comparator all of which are located remotely to the carrier, said command link operative to provide an emitter start-up signal and a blanking command signal, said emitter and blanking means operative in response to the command signals sent to the carrier when there is clutter present that might be confused with the carrier, respectively, to actuate the emitter and blanking means, said display storage means operative to store a first video frame of the carrier while the emitter is blanked out, and said comparator for comparing the first video frame without the emitter to a subsequent video frame including the emitter to distinguish between the clutter and the carrier.

51 Claims, 6 Drawing Sheets

U.S. PATENT DOCUMENTS

| | | | |
|---|---|---|---|
| 3,448,271 | 6/1969 | Aldrich et al. | 250/203 |
| 3,478,212 | 11/1969 | Turck | 244/3.14 |
| 3,564,257 | 2/1971 | Common et al. | 250/203 |
| 3,566,026 | 2/1971 | Bonebreak et al. | 178/6.8 |
| 3,567,163 | 3/1971 | Kepp | 244/3.14 |
| 3,598,344 | 8/1971 | Walters et al. | 244/3.11 |
| 3,640,628 | 2/1972 | Jones | 356/152 |
| 3,711,046 | 1/1973 | Barhydt et al. | 244/3.14 |
| 3,727,553 | 4/1973 | Godfrey | 102/70 |
| 3,733,133 | 5/1973 | Chapman | 356/152 |
| 3,742,238 | 6/1973 | Hoffman, II | 250/347 |
| 3,751,166 | 8/1973 | Starkey et al. | 356/5 |
| 3,753,538 | 8/1973 | Marsh et al. | 244/3.12 |
| 3,761,180 | 9/1973 | Maxwell, Jr. et al. | 356/152 |
| 3,787,668 | 1/1974 | Currie et al. | 235/152 |
| 3,796,396 | 3/1974 | Crovella | 244/3.11 |
| 3,797,395 | 3/1974 | Tyroler | 102/37.1 |
| 3,804,976 | 4/1974 | Gard | 178/6.8 |
| 3,820,742 | 6/1974 | Watkins | 244/3.11 |
| 3,848,830 | 11/1974 | Born | 244/3.16 |
| 3,856,237 | 12/1974 | Torian et al. | 244/3.11 |
| 3,868,883 | 3/1975 | Tucker | 89/1.8 |
| 3,889,117 | 6/1975 | Shaw, Jr. | 250/332 |
| 3,944,730 | 3/1976 | Dahlqvist et al. | 178/7.1 |
| 3,954,228 | 5/1976 | Davis, Jr. | 244/3.16 |
| 3,955,046 | 5/1976 | Ingham et al. | 178/6.8 |
| 3,974,383 | 8/1976 | Chapman | 250/342 |
| 3,974,984 | 8/1976 | Dobson et al. | 244/3.11 |
| 3,998,406 | 12/1976 | Smith et al. | 244/3.14 |
| 4,001,588 | 1/1977 | Elsner | 250/493 |
| 4,009,393 | 2/1977 | Ashley, Jr. et al. | 250/339 |
| 4,019,422 | 4/1977 | Magnuson | 89/1.815 |
| 4,020,339 | 4/1977 | Gustafson | 250/202 |
| 4,027,834 | 6/1977 | Heilig et al. | 244/3.11 |
| 4,027,837 | 6/1977 | Miller, Jr. et al. | 244/3.11 |
| 4,038,547 | 7/1977 | Hoesterey | 250/338 |
| 4,040,744 | 8/1977 | Schertz et al. | 356/152 |
| 4,047,117 | 9/1977 | Tuchyner et al. | 330/4.3 |
| 4,047,678 | 9/1977 | Miller, Jr. et al. | 244/3.16 |
| 4,054,797 | 10/1977 | Milton et al. | 250/332 |
| 4,060,830 | 11/1977 | Woolfson | 358/126 |
| 4,064,533 | 12/1977 | Lampe et al. | 358/105 |
| 4,072,281 | 2/1978 | Miller, Jr. et al. | 244/3.16 |
| 4,133,004 | 1/1979 | Fitts | 358/125 |
| 4,146,196 | 3/1979 | Schultz | 244/3.1 |
| 4,151,968 | 5/1979 | Lamelot | 244/3.16 |
| 4,162,052 | 7/1979 | Lamelot | 244/3.16 |
| 4,174,818 | 11/1979 | Glenn | 244/3.13 |
| 4,183,482 | 1/1980 | Jozwiak | 244/3.16 |
| 4,193,688 | 3/1980 | Watkins | 356/152 |
| 4,220,296 | 9/1980 | Hesse | 244/3.14 |
| 4,234,141 | 11/1980 | Miller, Jr. et al. | 244/3.13 |
| 4,247,059 | 1/1981 | Duke et al. | 244/3.16 |
| 4,406,429 | 9/1983 | Allen | 244/3.11 |
| 4,732,349 | 3/1988 | Maurer | 244/3.13 |

CARRIER TRACKING SYSTEM

Matter enclosed in heavy brackets [ ] appears in the original patent but forms no part of this reissue specification; matter printed in italics indicates the additions made by reissue.

This invention relates to an infrared carrier tracking, and more particularly to a system for tracking the carrier through clutter.

In the past guidance techniques, such as those disclosed in U.S. patent application, Ser. No. 896,087, filed Apr. 13, 1978 for a "Missile Detecting and Tracking Unit", have provided some clutter immunity as follows. During the early portion of the carrier flight, the carrier engine, if it has one and if not a beacon, is the brightest object in the detector field of view; all clutter objects have less intense images. The size and location of the clutter is stored so that it will not become confused with the beacon during the latter portion of flight when the carrier engine image is dim. In addition, a two dimension track gate is placed about the carrier to gate out any clutter. The gate is made just large enough to contain the portion of space into which the carrier is moving; as the carrier moves away, the gate is narrowed to eliminate widely scattered clutter. Nevertheless, when a moving carrier is tracked, new clutter is brought into the field view. Further, aspect angles of the clutter during the flight can change and clutter location can change due to operator jitter.

Accordingly, it is an object of this invention to provide for reliable, effective tracking of a carrier through clutter.

Another object of the invention is to provide a tracking system having a heat source whose intensity is controllable at short range to avoid blooming and to effect smoke penetration at long range.

Still another object of the invention is to provide a tracking system having clutter cancellation while tracking the carrier.

Yet another object of the invention is to provide a tracking system whose sub-system aboard the carrier is highly efficient and reliable, yet economical to produce using mass production techniques.

Briefly stated the invention comprises a tracking system which includes a beacon sub-system mounted upon a carrier, and a beacon control sub-system located remotely to the carrier. When a clutter ambiguity enters the field, the control sub-system sends a beacon interrupt signal to the beacon sub-system to interrupt the beacon. The resulting video frame is stored for comparison with a subsequent video frame taken with the beacon emitting energy. The subsequent frame is compared with the previous frame and the comparison reviewed to determine the location of the beacon. Any clutter present will be in both frames; however, the beacon will be present in only one frame. By this technique the clutter is differentiated from the carrier.

The novel features characteristic of the embodiments of the invention may best be understood by reference to the following detailed description when read in conjunction with the accompanying drawings wherein;

FIG. 1 depicts the utilization of a combined infrared sight and tracker unit;

Figure 2:
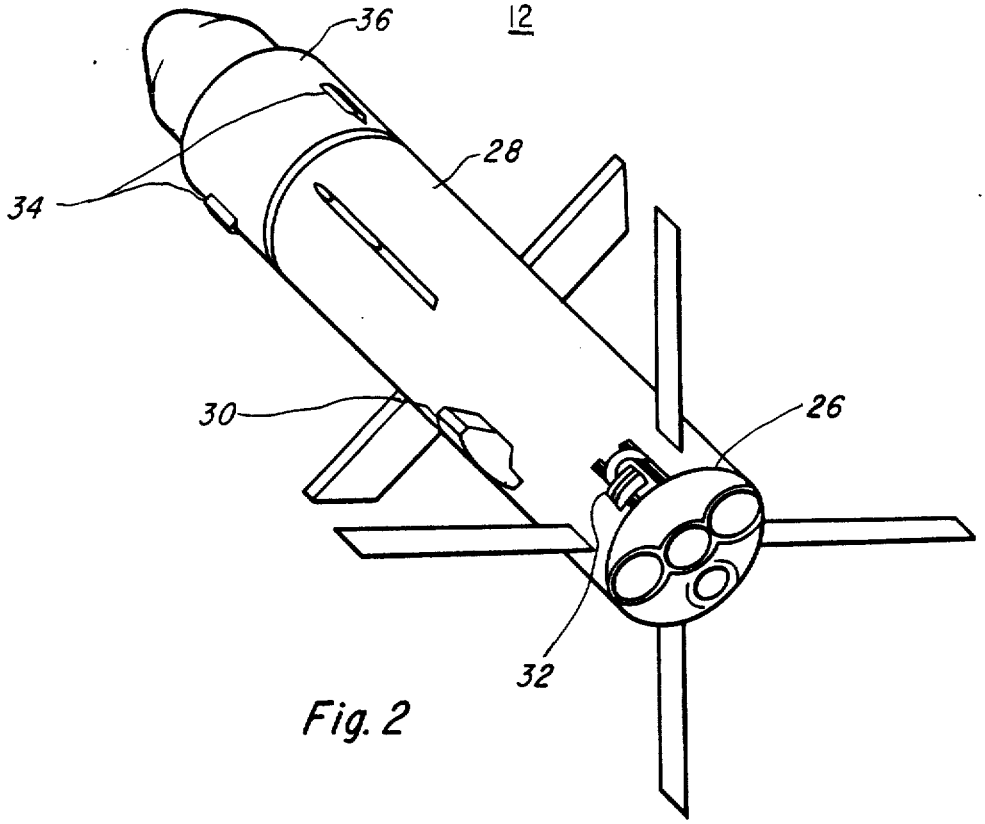
FIG. 2 is an isometric view of the carrier including the beacon shutter system.

For purposes of description and not by way of limitation the invention shall be described in connection with a guided missile used as the carrier. Such a guided missile is shown in FIG. 1 in which an infrared sight and tracker unit 10 comprises a missile 12 which has been launched from launcher 14 toward its destination or target 16. The target is shown as a tank viewed through the visual sight. It could also have been viewed through the infrared sight at the gunner's option. A beacon 18 is attached to the aft end of the missile 12. The beacon 18 is a part of the beacon system described hereinafter. A sighting means 20 which may be, for example, a thermal night sight such as that manufactured by Texas Instruments Incorporated under the designation AN/TAS4 Night Sight, is attached to the launcher 14 for viewing and tracking the carrier 12. The night sight is a forward looking infrared receiver and imaging device which includes a linear array of infrared detectors for scanning a field of view to detect the thermal energy emitted from the carrier's beacon. The night sight is modified, as hereinafter described, to accommodate a beacon control sub-system.

Each detector of the sighting means together with its preamplifier constitutes a channel (not shown) connected to an electronics package 22. A controller 24 controls the launching of the missile, activation of the night sight infrared receiver and activation of the beacon tracker unit. The electronics package 22 includes a microprocessor, which is preferably a Texas Instruments Incorporated SBP9900 microprocessor, controlled by the controller 24.

The carrier missile 12 (FIG. 2) includes a beacon system 26, a housing 28, an electronics pod 30 attached to the housing, an umbilical connector 32, and ballast 34 attached to the faring 36. The housing 28 has an aft end to which the beacon system is attached and a body portion to which the electronics pod 30 is attached. The electronics pod 30 contains the electronics for the beacon system. The umbilical connector 32 connects the electronics pod 30 to the beacon system 26. The ballast 34 attached to the faring 36 is to maintain the center of gravity or balance of the carrier owing to the weight of the beacon system.

Figure 3:
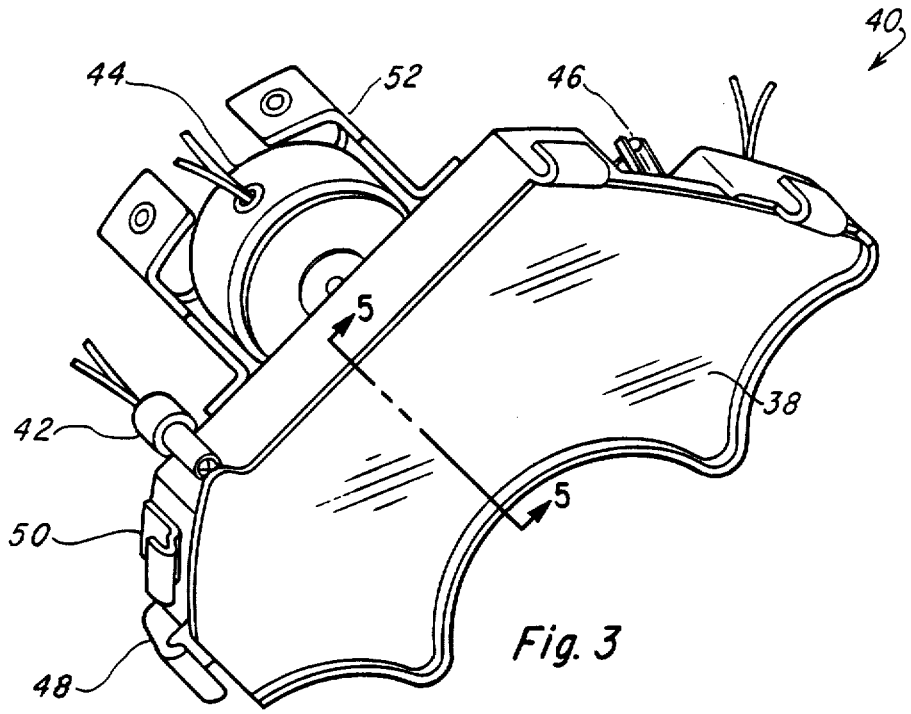
FIG. 3 is an isometric view of the beacon shutter system.
Figure 5:
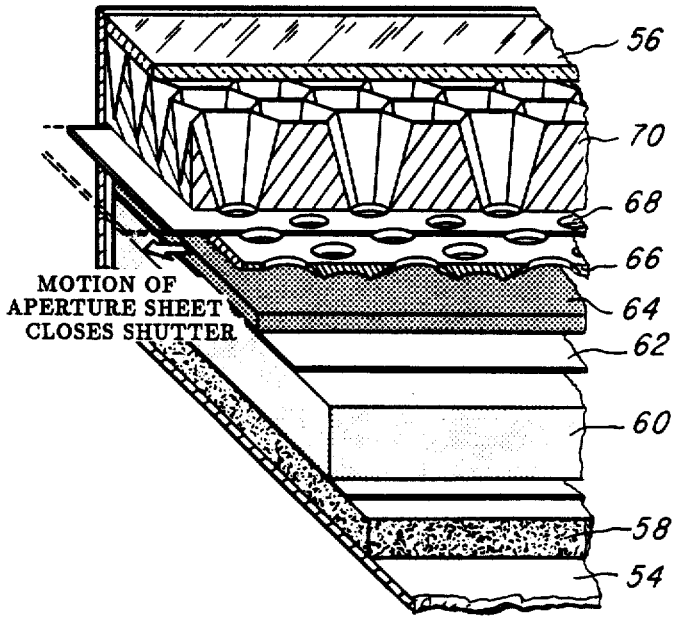
FIG. 5 is a fragmentary cross sectional view of the thermal beacon taken along line A—A of FIG. 3.

Referring now to FIG. 3, the beacon system comprises a housing 38, a pyrotechnic igniter 40, a squib hammer 42, a shutter actuator 44, shutter drive linkage 46, a shutter return spring 48, installation hooks 50, and an installation bracket 52. The housing 38 is attached to the missile housing 28 (FIG. 2) by the bracket 52 and hooks 50. The housing 38 includes a case 54 FIG. 5 having an open end covered by a frangible glass cover 56. The case 54 may be, for example, a cast carbon type case. The frangible glass cover is shattered for removal by the squib hammer 42 (FIG. 3). A layer of non-combustible insulation material 58 (FIG. 5) covers the bottom of the case. A pyrotechnic heater 60 is hermetically sealed in foil 62 for protection during storage. The pyrotechnic heater may be selected from the group of intermetallic reaction pyrotechnic materials consisting of titanium boride, titanium boride plus titanium carbide, titanium carbide, zirconium boride, and zirconium carbide. The foil 62 is a heat meltable foil which melts when the pyrotechnic heater is ignited thereby enhancing the thermal path to an emitter 64. The emitter 64 is, for example, a carbon type emitter capable of withstanding the high temperature (3800° C.) effects.

Figure 4:
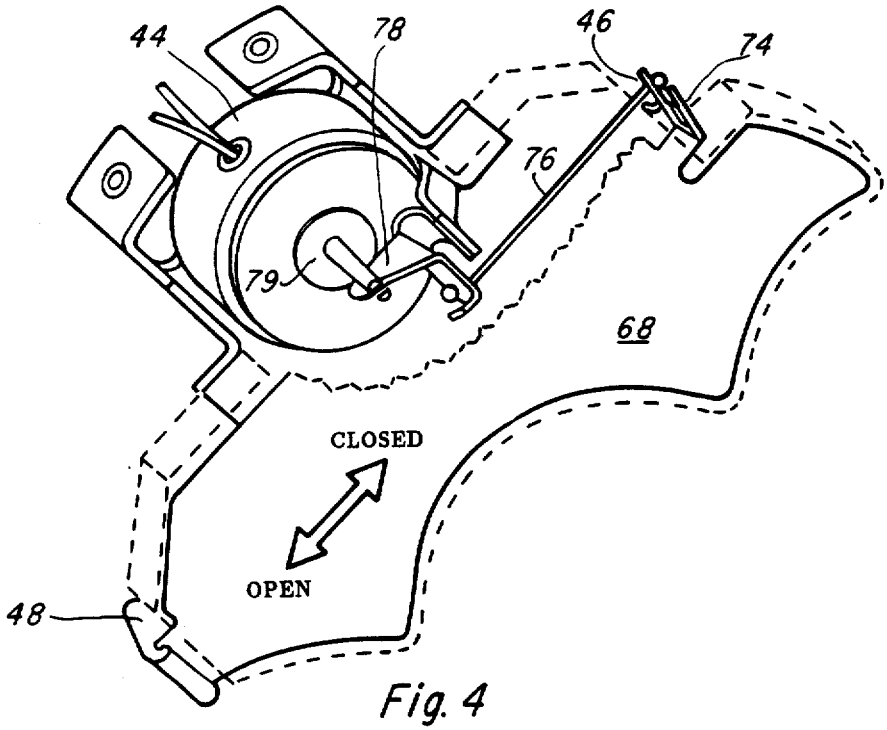
FIG. 4 is an isometric view of the shutter drive having a portion of the housing broken away to show more clearly the shutter drive mechanism.

An apertured base plate 66 covers the emitter 64. An apertured sheet 68 is slidably mounted in base plate guides between the apertured base plate 66 and an apertured honeycomb optics 70. The aperture sheet 68 acts as a shutter for obscuring the apertures of the base plate 66 and honeycomb optics 70, which are in alignment, when displaced by about ½ the hole spacing. The apertured sheet or shutter 68 has two flexures 48 and 74 at opposite ends (FIG. 4). Flexure 48 acts as a return spring to hold the shutter 68 open, i.e. the aperture sheet holes are aligned with those of the base plate and honeycomb optics. Flexure 74 acts as a transfer lever to the drive linkage 46.

The drive linkage 46 includes a rod 76 having, for example, ball shaped ends. The ball shaped ends of rod 76 extend, respectively, through slots in flexure 74 and one arm of a slotted flexure-pivoted bell crank 78. The other arm of the flexure-pivoted bell crank is attached to the core 79 of a linear solenoid comprising the shutter actutor 44. Thus, with the return spring 48 pulling the aperture sheet and the linear solenoid pulling the shutter drive linkage to close it the system always acts in tension thereby utilizing the tensile strength of the member to substantially reduce the size of the members.

Figure 6:
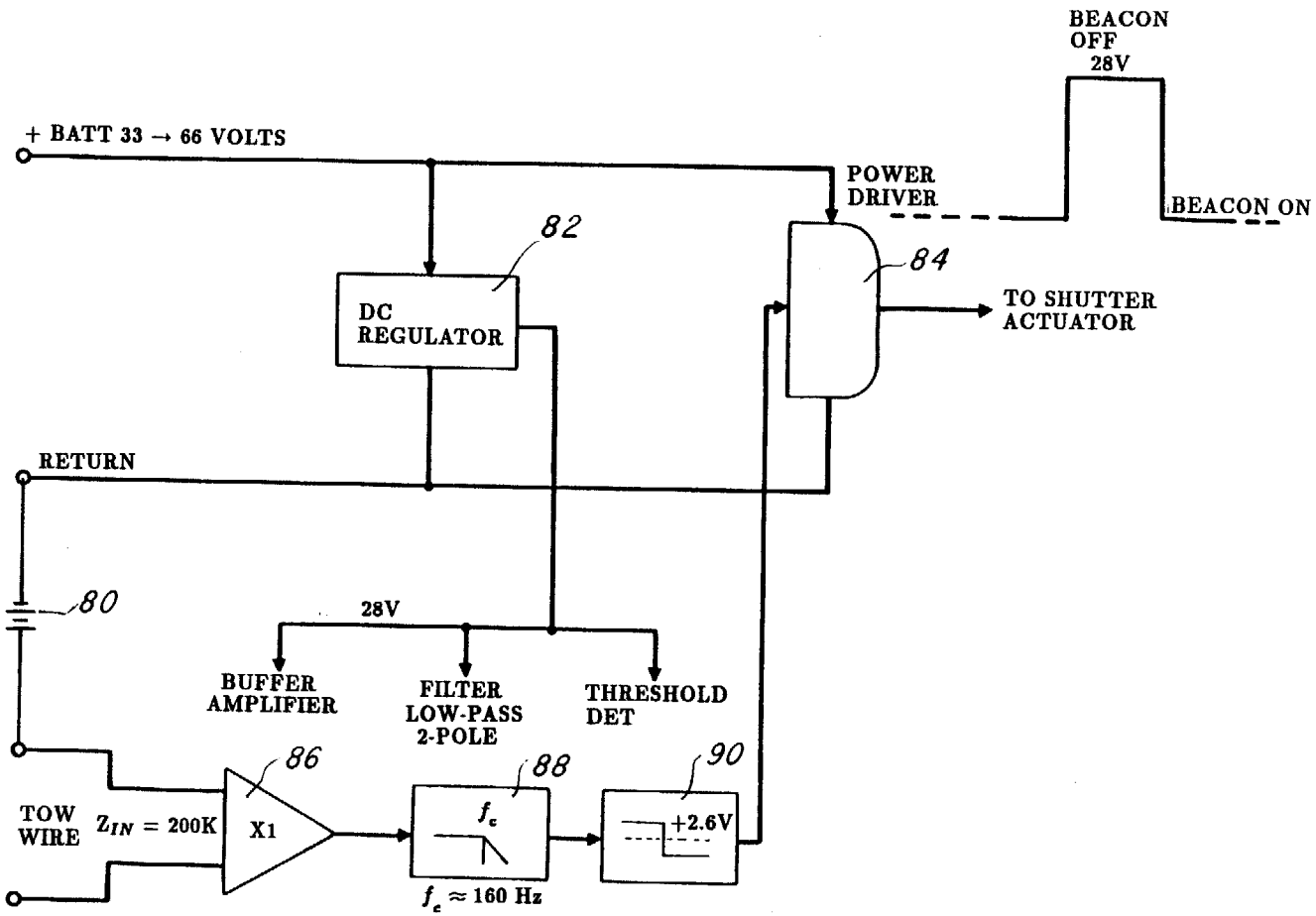
FIG. 6 is a schematic view of the shutter-signal separation circuit and power driver of the shutter electronics.

The shutter electronics 30 (FIG. 2) comprises a shutter-signal separation circuit and power driver packaged separately from the beacon to fit the available space and reduce mass unbalance in the missile. A power source such as, for example, the existing missile battery 80 (FIG. 6) provides power to a dc regulator 82 and power driver 84. The dc regulator provides selected dc voltages to a buffer amplifier 86, 2-pole low pass filter 88 and threshold detector 90. The buffer amplifier 86 reestablishes the values of the guidance and beacon actuator signals received by the missile. The two-pole, low pass filter, with a preselected corner frequency rejects the missile steering commands and passes the shutter actuating dc pulse. The dc shutter pulse signal triggers a threshold detector 90 which drives the power driver output stage 84. The power driver contact is connected to the shutter actuator 44 solenoid (FIGS. 3 & 4). The command pulse duration is selected to keep the shutter closed for an interval equal to one time frame of the night sight.

Figure 7:
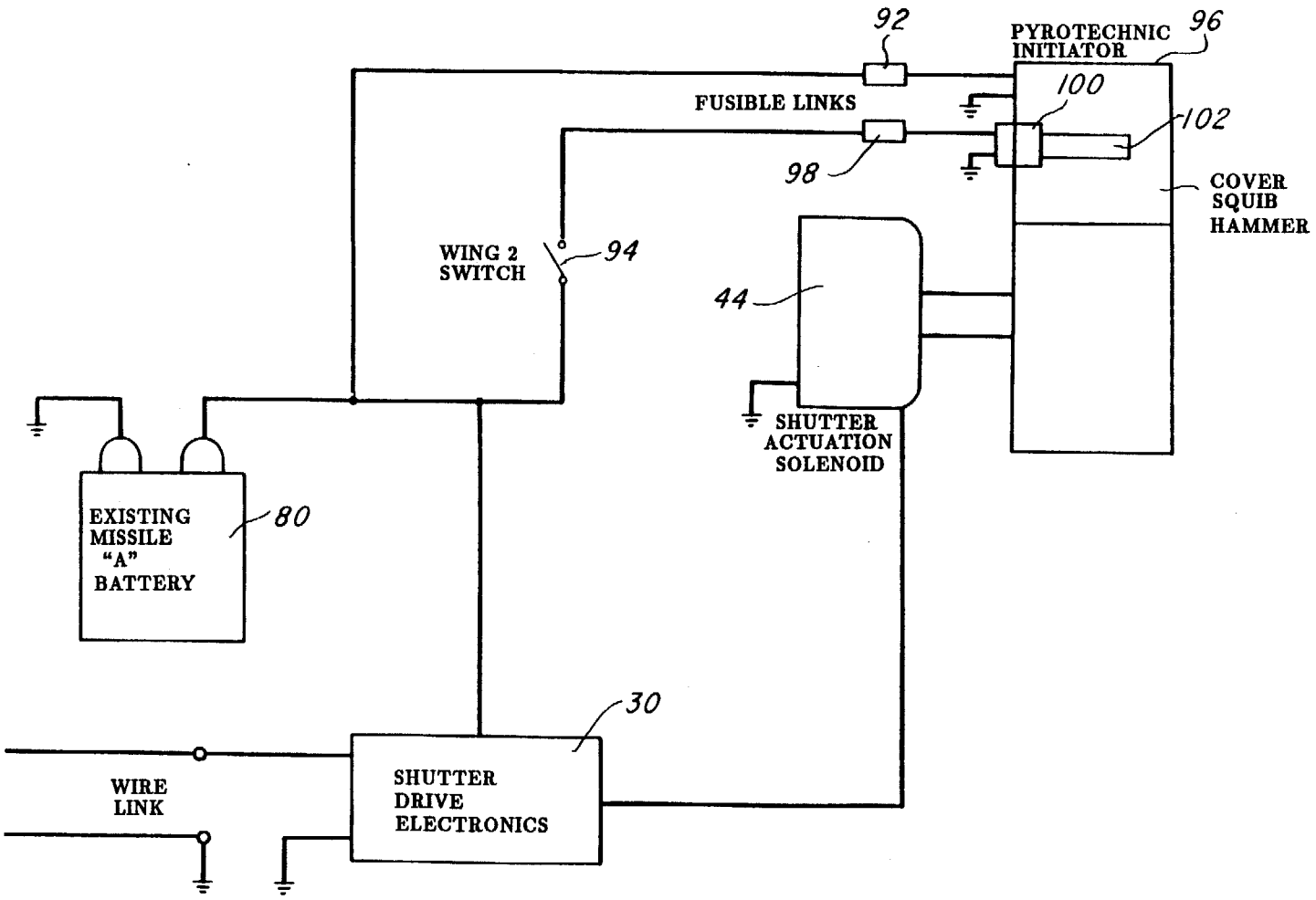
FIG. 7 is a schematic of the beacon/carrier interface.

The beacon/missile interface electronics (FIG. 7) comprises the power source 80 which is connected to the junction of the shutter drive electronics pod 30, fusible link 92 of a pyrotechnic initiator branch circuit, and switch 94 of a squib hammer branch circuit. The pyrotechnic initiator branch circuit, in addition to the fusible link 92 includes a pyrotechnic initiator 96, which is, for example, an electrically fired heat match. The squib hammer branch circuit includes, in addition to the switch 94, a fusible link 98 connected to the switch 94 and to a squib 100. The fusible links 92 and 98 are included in the heater ignition and cover removal circuits to protect the battery from potential overloading.

At start up, the squib of the squib hammer circuit is fired electrically and the gas generated drives the hammer 102 which is a low brisance pyrotechnic hammer. The cover 56 being a chemically tempered glass having a thickness of about 0.050 to 0.060 inch and a modulus of rupture of about 40,000 psi. is fragmented and removed by the hammer within about 10 milliseconds. Also at start up the beacon or heater is fired. The heater pyrotechnic has a propagation velocity such that the time for the reaction to spread to the entire source is comparable to the missile's flight time. Thus, the emitter 64 (FIG. 5) first meets the need for lower intensity early in flight and is gradually raised throughout the flight to meet the higher intensity need during the later stages of flight.

As previously described the shutter drive electronics 30 (FIG. 2) controls the actuation of the shutter actuator 44 solenoid (FIG. 3). Standby power for the shutter electronics 30 is low (about 1 watt). When shutter operation is commanded, each cycle draws up to about 10 watt-seconds.

Figure 8:
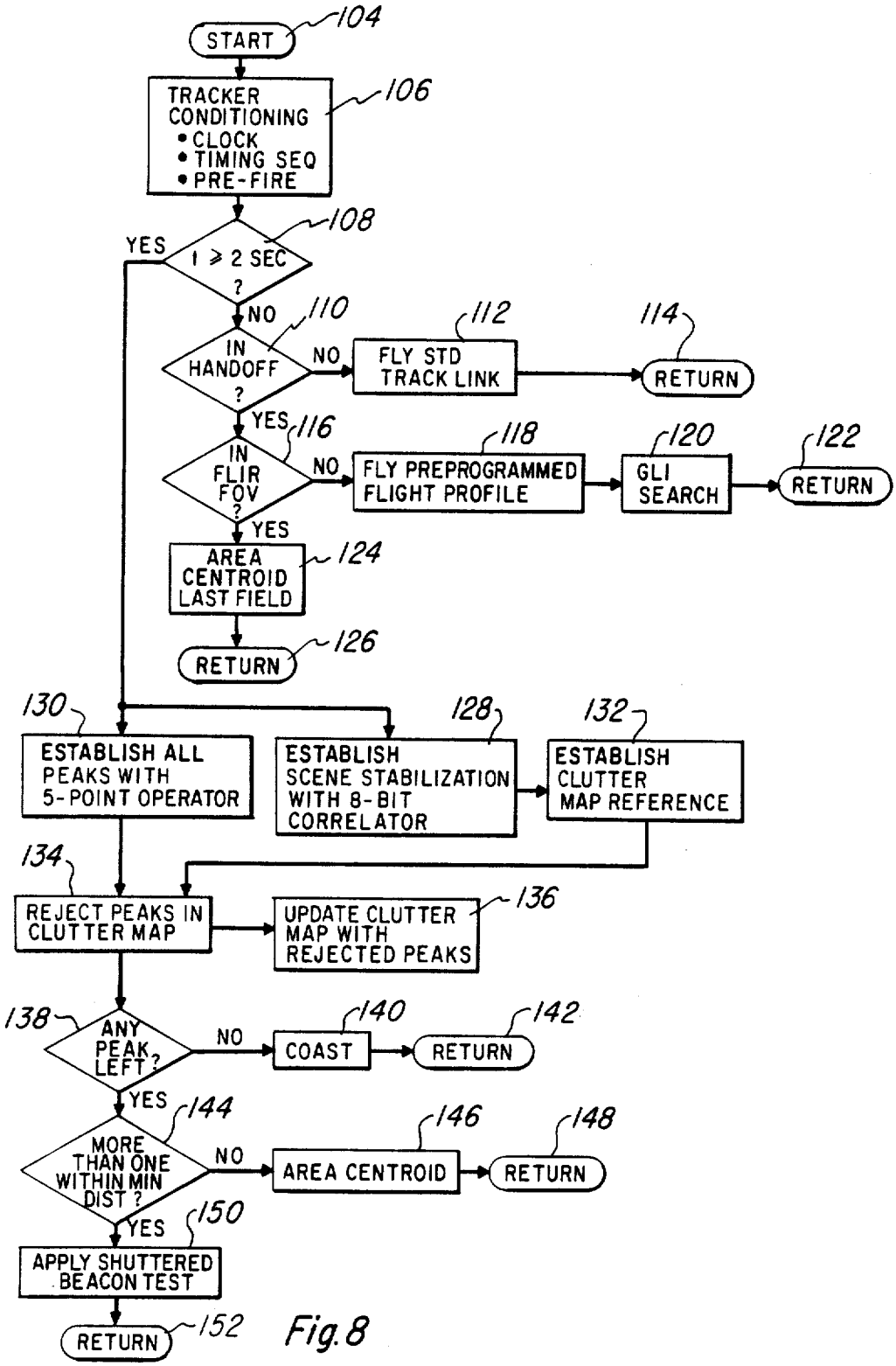
FIG. 8 is a simplified flow diagram of the infrared sight and tracker unit.

Shutter operation, if it occurs at all, will happen near the end of the flight. The microprocessor of the electronics package 22 (FIG. 1) is programmed (FIG. 8) so that upon receipt of a start up signal 104 tracker conditioning 106 is effected by starting the clock, timing sequence and determining pre-fire conditions. A time decision 108 is then made. If the time is less than a preselected time, a decision 110 is made whether the tracker is in handoff. Handoff results when the tracker looses the missile. If the answer is no the computer commands the missile to fly a standard track link 112, and the computer returns 114 to start 104. If the tracker is in handoff, a decision 116 is made whether the missile is in the field of view of the forward looking infrared (FLIR) sight. If not, a command 118 is given for the missile to fly a preprogrammed flight profile. Next a command 120 is given to activate a GLI tracker for missile acquisition and the computer returns 122 to start 104. If the missile is in the field of view a command 124 is given to compute the centroid area of the last field and based thereon to compute a position estimate. The computer then returns 126 to start.

When the decision 108 is that the preselected time has been reached, commands 128 and 130 are given to establish, respectively, scene stabilization and a peak set. Next a command 132 is given to establish a clutter map reference from the stabilized scene. Then a command 134 is given to reject peaks in the clutter maps by comparing the established peaks with the clutter map reference. Next a command 136 is given to update the clutter map. Then a decision 138 is made whether any peak remains. If no peak remains a command 140 is given for the tracker to coast and then return 142 to start 104. If yes, a decision 144 is made whether more than one peak exists within a reasonable radius of the previous missile track. If only one peak exists, a command 146 is given to compute the centroid area which is converted to guidance signals. Then the computer returns 148 to start. If more than one peak exists, a command 150 is given to actuate the beacon shutter system, and the beacon shutter 68 is closed for one video frame. All peaks appearing in the map during this frame are known to be clutter and are entered in the clutter map. The beacon is then turned on again and the computer returned 152 to the start.

Although only a single embodiment of this invention has been described herein, it will be apparent to one skilled in the art that various modifications to the details of construction shown and described such as for example, substituting a laser (CO2 laser) for the pyrotechnic, may be made without departing from the scope of the invention.

What is claimed is:

1. A carrier tracking method for detecting, tracking, and guiding a missile having a beacon thereon comprising:

(a) establishing an image of a first selected scene including only clutter;

(b) establishing the peaks of a second scene including clutter and the beacon;

(c) stabilizing the second scene with respect to the first scene;

(d) comparing the stabilized image of the second scene with the peaks of the first scene;

(e) eliminating the peaks in both scenes which correspond to each other;

(f) if more than one peak remains, selectively activating a blanking means to remove the peak produced by the beacon;

(g) identifying as clutter any remaining peaks in the scene; and (h) activating the blanking means to return the beacon to the scene.

2. A carrier tracking method for detecting, tracking, and guiding a missile having a beacon thereon *with a system which tracks the missile within a field of view, the method* comprising:

(a) issuing a command signal to launch the missile and activate the beacon;

(b) issuing a command signal to acquire the missile for tracking;

(c) determining whether the [missile] tracking system has lost the missile and is in hand off;

(d) determining whether the missile is in the [missile] tracking system field-of-view;

(e) establishing an image of a first selected scene including only clutter to form a clutter map reference;

(f) establishing the peaks of a second scene including clutter and the beacon;

(g) stabilizing the second scene with respect to the first scene;

(h) comparing the clutter map reference with the established peaks of the first scene and [update] *updating* the clutter map;

(i) eliminating the peaks in both scenes which correspond to each other;

(j) if more than one peak remains, selectively activating a shutter to remove the beacon from the scene;

(k) identifying the remaining peaks as clutter; and (l) activiating the shutter to return the beacon to the scene.

3. A carrier tracking system for detecting, tracking and guiding a carrier to a destination comprising:

(a) guidance means mounted on the carrier for guiding the carrier;

(b) guidance control means positioned off the carrier, said guidance control means operative to provide guidance signals to the guidance means;

(c) a beacon system, said beacon system including a beacon subsystem mounted on the carrier and a beacon detector and control subsystem positioned off the carrier, said beacon subsystem mounted on the carrier includes a beacon and means for blanking out said beacon and said beacon detector and control subsystem includes a thermal detector for mapping thermal energy emanating from a scene which includes clutter and said beacon, means for establishing thermal peaks in the scene corresponding to the clutter and the beacon, comparator means for comparing the map of thermal energy with the thermal peaks, means for selectively operating the blanking means to blank out the beacon to determine clutter and beacon identification; and (d) means for determining guidance signals from the beacon detector and control subsystem for the guidance control means.

4. A carrier tracking system according to claim 3 wherein the beacon is a pyrotechnic heater.

5. A carrier tracking system according to claim 3 wherein the beacon is a laser.

6. A carrier tracking system according to claim 5 wherein the laser is a $CO_2$ laser.

7. A carrier tracking system according to claim 3 wherein the beacon is a pyrotechnic heater and the means for blanking out said beacon includes a shutter for selectively interrupting beacon emission.

8. A carrier tracking system according to claim 3 wherein the beacon is a laser and the means for blanking includes a means for selectively turning the laser on and off.

9. A carrier tracking system according to claim 4 wherein the beacon subsystem further includes an emitter mounted on a major surface of the pyrotechnic heater.

10. A carrier tracking system for detecting, tracking and guiding a carrier to a destination comprising:

guidance means mounted on the carrier for guiding the carrier, guidance control means positioned off the carrier, said guidance control means operative to provide guidance signals to the guidance means, a beacon system, said beacon system including a beacon subsystem mounted on the carrier and a beacon detector and control subsystem positioned off the carrier, said beacon subsystem comprising a beacon and means for blanking out the beacon and said beacon detector and control subsystem including a thermal detector for sensing the thermal energy emanating from a scene which includes clutter and said beacon, means for selectively operating the blanking means to blank out the beacon such that the thermal detector senses only the clutter from such scene, comparison means for comparing the scene with clutter only to the scene with clutter and the beacon to distinguish the beacon from the clutter, and means for determining guidance signals from the beacon detector and control subsystem for the guidance control means.

11. A carrier tracking system according to claim 10 wherein the beacon is a pyrotechnic heater.

12. A carrier tracking system according to claim 10 wherein the beacon is a laser.

13. A carrier tracking system according to claim 10 wherein said beacon is a pyrotechnic heater and said means for blanking is a shutter for selectively interrupting beacon emission.

*14. A carrier tracking method for detecting, tracking, and guiding a missile having a beacon thereon comprising:*

(a) establishing an image of a first selected scene including only clutter;

(b) establishing the peaks of a second scene including clutter and the beacon;

(c) eliminating the peaks in both scenes which correspond to each other;

(d) if more than one peak remains, selectively activating a blanking means to remove the peak produced by the beacon;

(e) identifying as clutter any remaining peaks in the scene; and (f) activating the blanking means to return the beacon to the scene.

15. A carrier tracking method for detecting, tracking, and guiding a missile having a beacon thereon with a system which tracks the missile within a field of view, the method comprising:

(a) issuing a command signal to launch the missile and activate the beacon;

(b) issuing a command signal to acquire the missile for tracking;

(c) establishing an image of a first selected scene including only clutter to form a clutter map reference;

(d) establishing the peaks of a second scene including clutter and the beacon;

(e) comparing the clutter map reference with the established peaks in the first scene and updating the clutter map;

(f) eliminating the peaks in both scenes which correspond to each other;

(g) if more than one peak remains, selectively activating a shutter to remove the beacon from the scene;

(h) identifying the remaining peaks as clutter; and (i) activating the shutter to return the beacon to the scene.

16. A system for detecting and tracking a carrier on route to a destination wherein a radiation transmitting system mounted on the carrier includes a beacon and means for blanking out the beacon in order to selectively transmit radiation to a radiation detector positioned to map energy emanating from a scene which includes the carrier and provide frames of video data corresponding to the scene, said system for detecting and tracking comprising:

input circuitry for receiving video data;

output circuitry to provide control data to the carrier;

means, coupled to the input circuitry, for identifying peaks in a first frame of video data which correspond to the beacon and clutter present in the scene;

means, coupled to the output circuitry, for blanking out beacon radiation in order for the input circuitry to receive video data from a second frame that does not include a peak corresponding to the beacon; and means for comparing the first and second video frames and identifying peaks in the second frame as clutter.

17. The system of claim 16 further including means, coupled to the output circuitry, for providing carrier guidance signals based on a comparison of the first and second video frames.

18. The system of claim 16 wherein peaks identifiable in the first and second frames correspond to thermal energy detectable with an infrared night sight.

19. The system of claim 16 wherein the blanking means provides control signals for mechanically shuttering a beacon formed with a pyrotechnic heater.

20. The system of claim 16 further including means for defining a track gate about the beacon image in a segment of video data as the carrier approaches the destination and wherein said track gate serves to isolate the beacon image from clutter.

21. The system of claim 16 formed as:

an electronics package comprising a microprocessor and adapted for coupling to a radiation detector; and a controller which controls launching of the carrier, activation of the detector and activation of said means for comparing the first and second video frames.

22. A guidance processing and control system for tracking a carrier in the presence of clutter, said carrier including a beacon system for selectively transmitting radiation based on remote control signals, said processing and control system capable of tracking the carrier in conjunction with a sight and electronics of the type which outputs frames of video data based on energy emanating from a scene that includes the carrier, said system comprising:

processing circuitry positioned off the carrier for tracking and guiding the carrier and for selectively controlling transmission of radiation from the beacon system to the sight; and a storage medium containing information to correlate signal peaks in different frames of the video data and criteria for selectively controlling transmission of radiation from the beacon system to the sight, said processing circuitry coupled to receive said information from the storage medium to (a) generate a reference map based on the video data, (b) compare peaks in a second frame of the video data with peaks in the reference map, and (c) selectively control transmission of radiation to the sight.

23. The system of claim 22 wherein the sight is a thermal night sight responsive to infrared radiation.

24. The system of claim 22 wherein said processing circuitry comprises digitally based semiconductor electronics which provides signals for tracking the carrier.

25. The system of claim 22 wherein said processing circuitry is formed as:

an electronics package comprising a microprocessor and adapted for coupling to the sight; and a controller which controls launching of the carrier, activation of the sight and comparison of peaks.

26. The processing and control system of claim 22 operable with a beacon system of the type which includes a radiation source in combination with a mechanical shutter and wherein transmission of radiation to the sight is controlled by providing signals which effect movement of the mechanical shutter.

27. The processing and control system of claim 22 wherein said processing circuitry operates to distinguish clutter from radiation transmitted from the beacon system by identifying clutter in a segment of video data acquired during a period when radiation is not transmitted from the carrier to the sight.

28. The processing and control system of claim 22 wherein said processing circuitry, when operating in conjunction with said storage medium, serves to define a track gate about an image corresponding to beacon radiation, said gate formed in segments of video data as the carrier approaches the destination to isolate the beacon image from clutter.

29. A digital processing system for tracking and guiding a carrier which includes a beacon system for transmitting radiation, based on remote control signals, to instrumentation of the type which outputs frames of video data indicative of a scene, said processing system comprising:

*input circuitry for receiving frames of video data output by the instrumentation and corresponding to imaged scenes containing the carrier;*

*output circuitry for providing control signals to the beacon system in order to transmit radiation to the instrumentation; and*

*data processing circuitry coupled to said input and output circuitry for (a) selectively providing the control signals to transmit radiation from the beacon system to the instrumentation and (b) comparing peaks in different frames of video data to identify data in a video frame which corresponds to the carrier.*

*30. The system of claim 29 wherein said selective provision of control signals by said data processing circuitry is based on identification of a predetermined condition discernable from the video data.*

*31. The system of claim 30 wherein the predetermined condition corresponds to identification of more than one peak in a frame of video data which results after comparing or eliminating peaks in the different video frames which correspond to one another.*

*32. The system of claim 29 wherein said data processing circuitry includes decision-making criteria, representable in the form of digital information, for selectively transmitting radiation from the beacon system to the instrumentation.*

*33. The system of claim 29 wherein said data processing circuitry includes instructional information for correlating a peak in a segment of data with the carrier by first identifying, as clutter, one or more peaks in a second segment of data acquired during a period when the instrumentation is not receiving radiation from the beacon system.*

*34. The system of claim 29 wherein said data processing circuitry is responsive to the presence of a clutter ambiguity in one of the scenes, said circuitry providing said output circuitry with a control signal for interrupting transmission of radiation from the beacon system to the instrumentation.*

*35. The system of claim 34 wherein said processing circuitry stores a segment of video data acquired during a period when radiation from the beacon system to the instrumentation is interrupted in order to compare peaks in said segment of data with peaks in a segment of data associated with a different video frame.*

*36. A guidance processing and control system for tracking a carrier in the presence of clutter, wherein the carrier includes a beacon system for selectively transmitting and not transmitting radiation based on remote control signals, said processing and control system capable of tracking the carrier in conjunction with a sight and electronics of the type which outputs frames of video data based on energy emanating from a scene that includes the carrier, said processing and control system positioned off the carrier and comprising:*

*input circuitry adapted to receive segments of video data for tracking the carrier;*

*output circuitry adapted to provide guidance signals and control signals for the carrier;*

*a storage medium containing instructional information in the form of binary data; and*

*processing circuitry, connected to said input circuitry, said output circuitry and said storage medium, for operating on segments of video data with instructional information derived from the binary data to*

*(a) eliminate peaks in a first segment of data which correspond to peaks present in a second segment of data based on an initial comparison between segments, and*

*(b) provide a control signal to said output circuitry for selectively transmitting radiation from the beacon system to the sight in order to track the carrier.*

*37. The system of claim 36 wherein selective transmission of radiation from the beacon system to the sight is effected with an interrupt signal to prevent transmission and thereby prevent a frame of video data from including a peak which corresponds to the carrier.*

*38. The system of claim 36 wherein each segment of video data corresponds to a portion of a different frame.*

*39. The system of claim 36 wherein the processing circuitry, in cooperation with the instructional information, provides signals to control the beacon system for selectively not transmitting radiation to the sight in order to identify as clutter a peak remaining in the first segment of data after one or more other peaks are eliminated on the basis of the initial comparison.*

*40. The system of claim 36 formed as:*

*an electronics package comprising a microprocessor and adapted for coupling to the sight; and*

*a controller which controls launching of the carrier, activation of the sight and the initial comparison between segments of data.*

*41. In a carrier tracking system for detecting, tracking and guiding a carrier to a destination, a beacon control system positionable on the carrier for receiving control commands from a remote source, said beacon control system comprising:*

*input circuitry responsive to control signals originating off the carrier for selectively transmitting and not transmitting radiation to a location off the carrier.*

*42. The system of claim 41 further including an electromechanical shutter system operatively coupled to the input circuitry for effecting selective transmission of the radiation in response to the control signals.*

*43. The system of claim 42 wherein the shutter system, when mounted on the carrier, is responsive to the control signals to blank out the radiation with respect to the location off the carrier.*

*44. In a carrier tracking system for detecting, tracking and guiding a carrier, of the type which includes input circuitry for receiving guidance commands from a remote source, a beacon system positionable on the carrier and responsive to control signals originating off the carrier for selectively varying transmission of radiation to a location off the carrier.*

*45. The system of claim 44 wherein the beacon system comprises an electromechanical shutter system operatively coupled to the input circuitry for alternately transmitting radiation in response to the control signals.*

*46. In a carrier tracking system for detecting, tracking and guiding a carrier to a destination, a carrier comprising:*

*input circuitry for receiving control signals from a remote source; and*

*a beacon system responsive to said control signals for selectively varying transmission of radiation to a location off the carrier.*

*47. The carrier of claim 46 wherein the beacon system includes a laser responsive to said control signals to alternately transmit radiation to said location.*

*48. In a system for detecting, tracking and guiding a carrier to a destination, a carrier comprising:*

*input circuitry adapted to receive guidance commands for guiding the carrier and control signals from a remote source; and*

*a beacon system in electrical communication with said input circuitry and responsive to receipt of said control*

*signals by said input circuitry to selectively vary transmission of radiation to a location off the carrier.*

*49. The carrier of claim 48 wherein the beacon system operates to provide information to said remote source which distinguishes the carrier from clutter.*

*50. The carrier of claim 48 wherein said remote source operates in conjunction with a thermal night sight for viewing the carrier and wherein the beacon system provides information through the night sight to said remote source to distinguish the carrier from clutter.*

*51. The carrier of claim 48 wherein the carrier is a guided missile.*

* * * * *